Dec. 14, 1954  E. MITTELMANN  2,696,737
MAGNETIC TYPE FLOWMETER
Filed Dec. 14, 1949  2 Sheets-Sheet 1
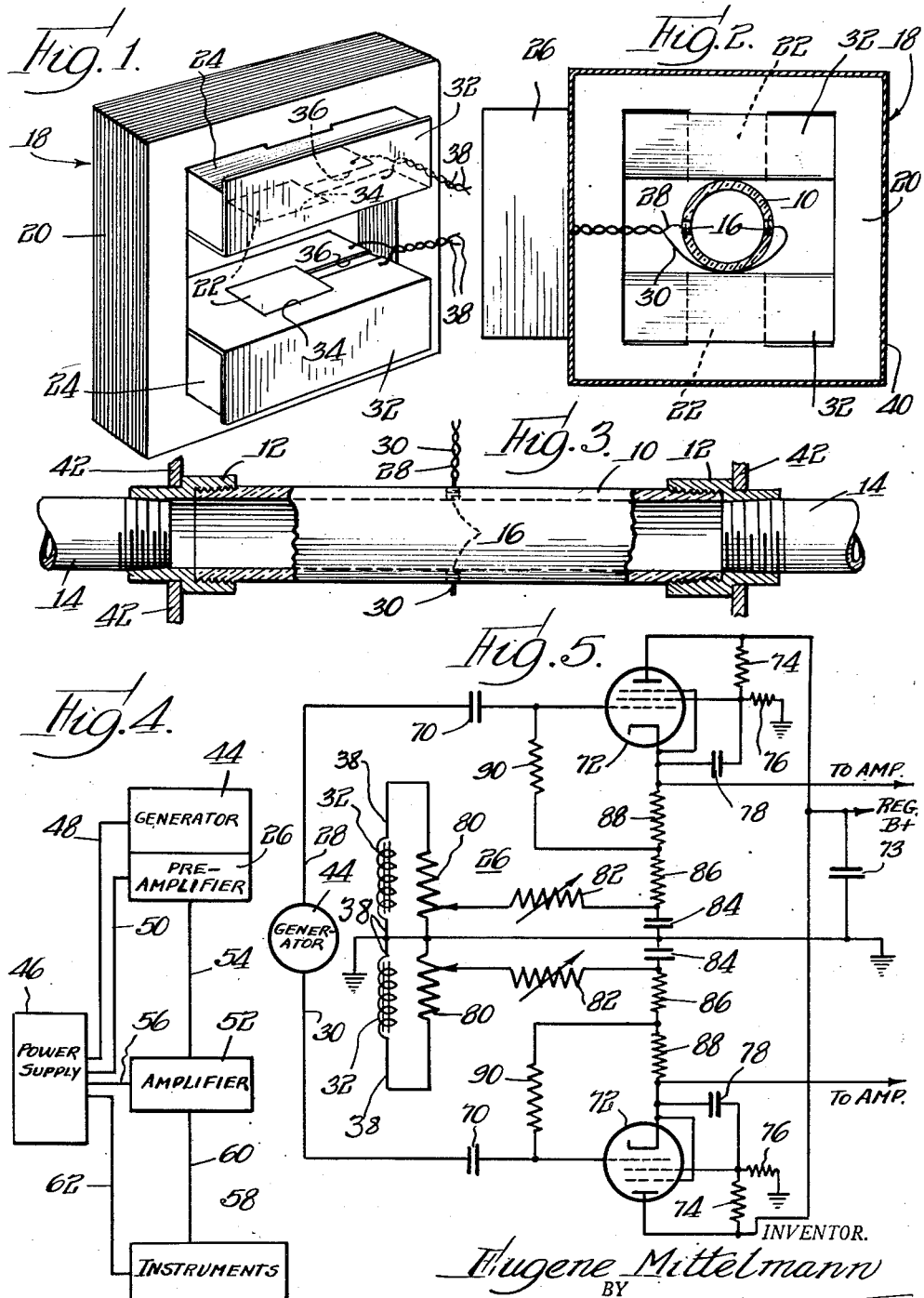
INVENTOR.
Eugene Mittelmann
BY
Moore, Olson & Trexler
Attys.

Dec. 14, 1954  E. MITTELMANN  2,696,737
MAGNETIC TYPE FLOWMETER
Filed Dec. 14, 1949  2 Sheets-Sheet 2

INVENTOR.
Eugene Mittelmann
BY
Moore, Olson & Trexler
Attys.

United States Patent Office 2,696,737
Patented Dec. 14, 1954

2,696,737

MAGNETIC TYPE FLOWMETER

Eugene Mittelmann, Chicago, Ill., assignor, by mesne assignments, to Erdco Engineering Corporation, Addison, Ill., a corporation of Delaware Application December 14, 1949, Serial No. 132,884

12 Claims. (Cl. 73—194)

This invention relates generally to apparatus for measuring fluid flow and more particularly to improvements in electromagnetic apparatus for measuring fluid flow.

In many industrial and other applications it is desirable to measure fluid flow, both as to rate of flow and as to total flow. In the control of many industrial processes it is imperative that changes in the rate of flow or total flow should be effective instantaneously to exert a control function. Mechanical measuring processes are too slow. To measure fluid flow rapidly, it has been proposed to utilize the principle of Faraday induction. This principle states that an electrical potential is induced in a medium moving through a magnetic field and is expressed in its simplest form by the equation $E=KuB$ where $u$ is the velocity of the medium, B is the magnetic field, and K is a suitable constant. When a magnetic field is established about a moving fluid, the fluid has a potential developed in it which can be detected by suitable electrodes. The potential so developed is generally rather small and it is desirable to amplify it before operating a meter or indicating instrument in response thereto.

Due to the low voltage developed, considerable trouble has been encountered in prior devices operating on the Faraday principle due to noise and stray pickup. Some prior fluid flow measuring devices which have operated on this principle and with which I am familiar have utilized a U-shaped flow tube in an attempt to balance out noise and pickup. Such tubes have led to installation problems, have restricted fluid flow, and have been difficult to clean. A further difficulty encountered is that flow tubes often must be installed in locations where it is impossible or undesirable to read an indication of fluid flow.

An important object of this invention is the provision of an electromagnetic fluid flow measuring device utilizing a straight flow tube and adapted to be installed by opening a pipe at any desirable location.

A further object of this invention is the provision of an electromagnetic fluid flow measuring device which is readable at a distant station.

A further object of this invention is the provision of an electromagnetic fluid flow measuring device having primary amplifying stages located as close as possible to pickup elements or electrodes in a flow tube in which said primary amplifying stages and said electrodes are carefully shielded.

For a maximum induced voltage, pickup elements or electrodes are diametrically spaced in a flow tube in the center of a magnetic field and perpendicular to the field. Thus no matter how close the primary amplification stages are to the electrodes and no matter how well the electrodes, amplifying stages and interconnecting leads are shielded, there is inadvertently some pickup. The magnetic field is preferably established by an electromagnet which for best results is energized by alternating current. This establishes a strong electrostatic field in addition to the stray magnetic flux and the electrostatic field and stray flux tend to introduce stray voltages in the electrode leads with consequent erroneous readings.

An object of this invention is the provision of electromagnetic fluid flow measuring apparatus in which shielding is provided to guard against unwanted electrostatic and electromagnetic fields.

A further object of this invention is the provision of apparatus as set forth in the foregoing object in which the shielding forms a loop and means is provided for injecting the voltage developed in the shielding into an amplifier at proper magnitude and phase to counteract pickup voltages.

As noted previously, it is necessary in many applications to know the total flow. It is possible to determine the total flow by means of an integrating instrument, but it is desirable that it should not be necessary to provide a special instrument having a restricted application.

An object of this invention is the provision of an electromagnetic apparatus for measuring the total flow of fluid.

A specific object of this invention is the provision of apparatus as set forth in the foregoing object in which total fluid flow is registered by a suitably calibrated watt-hour meter.

As noted in the last foregoing object, it is proposed herein to utilize a watt-hour meter to register the total fluid flow. The power recorded by a watt-hour meter is given by $W=PI$, where P is the potential across the potential coil and I is the current through the current winding. In general the cosine of the angle between the potential and current enters the equation, but for direct current operation or for alternating current operation when the potential and current are in phase, the cosine of the angle is 1. For A.-C. operation, it is desirable that this condition should be maintained as a higher reading is given and chance of error is reduced for a given voltage and current. As will be apparent hereinafter, means is provided for maintaining the voltage and current in phase and accordingly the cosine function is omitted in this discussion.

Considering the watt-hour meter in conjunction with the amplifier with which it is to be used in the apparatus disclosed herein, the current I is given by the equation $I=AV_i$, where A is the amplification in amperes per volt of the amplifier and $V_i$ is the amplifier input voltage in volts. $V_i$ is given by $$V_i = \frac{R_i}{R_i+R_g}\nabla V$$

where $R_i$ is the amplifier input impedance, $R_g$ is the internal impedance of the generator, and $\Delta V$ is the potential difference induced in the fluid between the electrodes. $\Delta V$ is given by $\Delta V=KBud$ where K is the constant of proportionality depending upon the velocity distribution function, B is the magnetic field, $u$ is the velocity of flow, and $d$ is the distance between the detecting electrodes. Combining these equations $$W=PA\frac{R_i}{R_i+R_g}KBud$$

If $$PA\frac{R_i}{R_i+R_g}$$

can be reduced to a constant, C, then the power recorded by the watt-hour meter may be expressed $W=KCu$. The distance, $d$, obviously remains constant. If the amplifier input resistance $R_i$ is made very much larger than $R_g$, which in practice is readily done, the factor $$\frac{R_i}{R_i+R_g}$$

is substantially constant. The amplification, A, can be made substantially constant and linear by proper design and depends on the voltage supply. B and P also depend on the voltage supply. Consequently if the voltage supply is maintained constant, the power recorded by the watt-hour meter becomes a linear function of a constant and the rate of fluid flow.

An object of this invention is the provision in electromagnetic fluid flow measuring apparatus of a well regulated power supply.

Other and further objects and advantages of the present invention will be apparent from the following description when taken in conjunction with the accompanying drawings in which:

Fig. 1 is a perspective view of the field magnet and shielding employed in my invention;

Fig. 2 is a front view of the field magnet showing the flow tube and detecting electrodes in cross section in operative position;

Fig. 3 is a side view partly in section showing my flow tube as it may be connected in a pipe;

Fig. 4 is a block diagram illustrating the component parts of the invention;

Fig. 5 is a schematic diagram of the first amplification stages, or a preamplifier;

Figure 6:
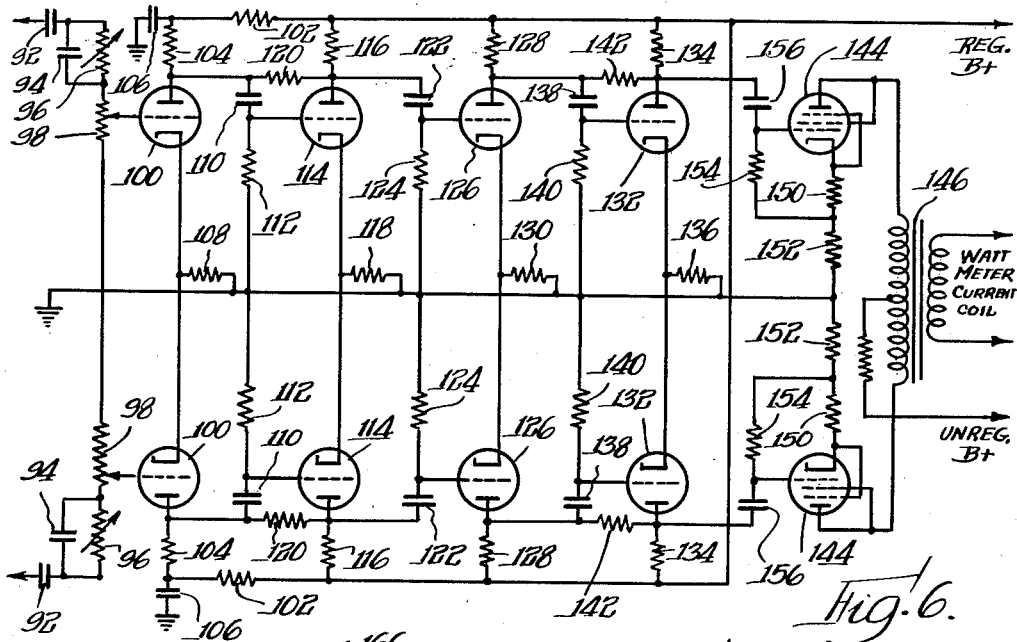
Fig. 6 is a schematic diagram of the amplifier exclusive of the preamplifier.

Reference should first be had to Figs. 1–3 wherein the parts to be inserted in an opening in a flow pipe are shown. A flow tube 10 of non-conducting material which may be, for instance, Lucite, is externally threaded at each end. The flow tube 10 is straight and uniform throughout its length so that fluid flow is not restricted and no special fittings are necessary. The flow tube 10 is rather short so that only a small section of pipe need be removed for its insertion. Female couplings 12 are threaded on to each end of the flow tube 10 and onto both sections of pipe 14 which are in turn connected by conventional plumbing connections to the flow pipe in which the device is to be used. A pair of pickup elements or electrodes 16 are threaded onto the side walls of the flow tube 10 on a diameter thereof. The inner faces of the electrodes are flush with the inner surface of the flow tube in order to avoid disturbing the fluid flow. The flow tube is placed within an electro-magnet 18 comprising a yoke 20 and poles 22. Windings 24 encircle the poles for energization thereof. The flow tube and magnet are located relative to one another so that electrodes 16 are adjacent to the area of greatest magnetic flux which is in line with the central plane of the poles 22. A preamplifier 26 is located directly adjacent the magnet 18 so that lead wires from the electrodes may be as short as possible to keep pickup at a minimum. The lead wires 28 and 30 from the electrodes to the preamplifier lie in the central plane of the magnet in so far as possible to reduce pickup, particularly where the wire 30 is brought around the tube 10, and the wires are twisted together in order to balance out pickup voltages in so far as possible. If desired, the lead wires 28 and 30 may be brought out through the laminations of the magnet yoke rather than around the yoke to reduce pickup still further although this will not in general be necessary.

In general there will be electrostatic and electromagnetic fields due to the coils of the magnetic winding which would normally induce voltages in the lead wires and perhaps in other parts of the apparatus to cause erroneous readings. To prevent such fields from causing unwanted pickup voltages, I have provided shield-compensators 32. Each of the shield-compensators comprises a copper or other conductive sheet covering the inner face and outer edges of each coil as best seen in Fig. 1. Each shield-compensator 32 is apertured as at 34 to accommodate one of the poles 22 and is split as at 36 along the central plane of the magnet. Each shield-compensator 32 thus forms a single turn coil with a special utility to be described later in addition to acting as a shield. Pairs of lead wires 38 are connected to each of the shield compensators 32 adjacent one end thereof on each side of the splits 36. The leads are twisted together to balance out pickup voltages. Still further to guard against stray voltages due to pickup the magnet including the coils and shield compensators, the flow tube electrodes, and lead wires therefrom are enclosed in a metallic box 40, which is preferably of copper or aluminum. The end walls 42 of the box 40 support the female couplings 12 and prevent any strain from being imposed on the flow tube 10. It is obvious that the end walls must be removable or have a removable portion so that the couplings 12 can be threaded onto the flow tube 10. The shielding box 40 is grounded through the couplings 12 and pipe 14 and an additional ground connection may be provided if necessary.

The magnet, flow tube, electrodes, and shielding box may be grouped together under the term generator as they cooperate to generate the signal proportional to the rate of flow. As shown in Fig. 4 the generator which is therein identified by the numeral 44, and the preamplifier 26 are the only parts which must be located at the flow pipe. This is most desirable as flow pipes carrying fluids are usually located at inconvenient or inaccessible places. A power supply 46 may be located at any convenient station and provides the generator and preamplifier with power through cables 48 and 50 respectively. The signal from the preamplifier is applied to an amplifier 52 by means of a matched transmission line or cable 54. The amplifier may be in any convenient location and is supplied with power from the power supply 46 by a cable 56. The indicating and registering instruments 58 may be located at any desired station which may be different from or the same as any of the previously noted stations. The instruments receive energized force from the amplifier 52 by means of a cable 60 and a cable 62 is provided from the power supply to the instruments to energize the potential coil of the watt-hour meter which as noted previously is used to register the total flow.

Figure 8:
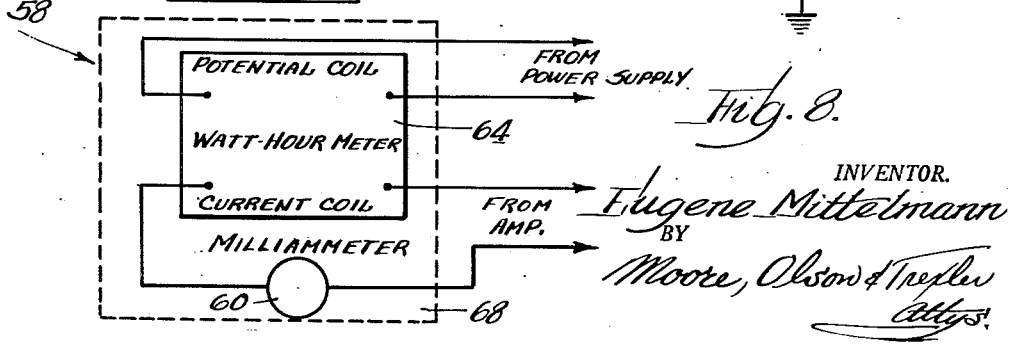
Fig. 8 is a block diagram showing the connections to the registering and indicating meter.

The instruments 58 (Fig. 8) comprise a watt-hour meter 64 and a milliameter 66 housed within a suitable case or cabinet 68 which may also house the power supply and amplifier. The potential coil of the watt-hour meter is supplied from a voltage source in the power supply as will be noted later with regard to the power supply and the current coil of the watt-hour meter is connected in series with the milliameter, the series combination being supplied by the amplifier output as will be described in greater detail at a later point.

If one of the pair of leads 28, 30 from the electrodes to the pre-amplifier were grounded as would necessarily be the case in a conventional amplifier, it would be impossible to balance out voltages induced in the lead wires. I have found that it is possible to balance out such signals to a large extent by use of symmetrical or push-pull stages of amplification throughout the preamplifier and amplifier. As shown in Fig. 5 the generator 44 is connected by the short high impedance lead wires 28 and 30 to the preamplifier 26. The lead wires 28 and 30 are connected through coupling capacitors 70 to the control grids of multi-grid electronic tubes 72 which may be of the 12SJ7 type. The plates of these tubes are supplied from a regulated B+ supply as indicated on the drawing. No plate load resistors are included in the plate power lines as the preamplifier is connected as a cathode follower to match a conventional low impedance transmission line. A capacitor 73 is connected from the plate power supply to ground. Similar voltage dividers comprising resistors 74 and 76 are provided for each tube 72 to supply potential to the screen grids, and capacitors 78 are connected from the junctions of these resistors to the respective cathodes.

In spite of the unconventional push-pull input to the preamplifier there is still an appreciable amount of noise voltage at the input to the preamplifier. To compensate for this a voltage is taken from a single turn formed by each shield-compensator 32 and injected into the cathode circuit of the preamplifier. Each shield-compensator 32 is grounded at one end and connected across a potentiometer 80 in order that the magnitude of the voltage injected into the cathode circuit may be correct. Adjustable resistors 82 and capacitors 84 are connected between the potentiometer taps and ground in order that the phase of the voltage injected into the cathode circuits may be adjusted correctly. The cathode circuit of each tube is completed by resistors 86 and 88 with the junctions of these resistors being connected through grid resistors 90 to the control grids of the respective tubes 72. The suppressor grids are conventionally connected to the cathodes and the balanced output from the preamplifier is taken from the cathodes as indicated in Fig. 5. The reason for resistance-capacitance coupling the preamplifier as well as the amplifier is that such coupling is not susceptible to the intolerable amount of noise pickup inherent in transformer coupling. The preamplifier is enclosed in a grounded metal box to shield the preamplifier, and the amplifier is also enclosed in a metal box for the same reason.

The amplifier as illustrated in Fig. 6 comprises four stages of push-pull amplification and a push-pull power output stage. The input to the first stage is connected through capacitors 92 to phase shifting networks comprising capacitors 94 and variable resistors 96. The reason for the phase shifting networks is that it is desirable to have the voltage and current in the watt-meter in phase in order to give maximum rotation. From the phase shifting networks the input is connected through volume control potentiometers 98. The volume controls are provided in order that the same amplifier can be used with any of a variety of different generators and different fluids and maximum flow velocities. The first stage of amplification comprises tubes 100 each of which may be one-half of a 6SL7 supplied with power from a regulated source of B+ as indicated on the drawing through resistors 102 and 104, the junction between said resistors being grounded through a capacitor 106. The cathodes of the tubes 100 are connected in parallel through a resistor 108 to ground. The output of the first stage is coupled by capacitors 110 and grid resistors 112 to the control grids of tubes 114 each of which may be one-half of a 6SL7. Plate power is supplied from the same regulated source of B+ through resistors 116 and the cathodes are grounded through a common resistor 118. The gain of the amplifier is maintained constant by inverse feedback which in the first two stages is supplied by resistors 120 connected between the plates of the tubes 100 and 114. The output of the second stage is supplied by capacitors 122 and grid resistors 124 to the grids of electron tubes 126 each of which may be one-half of a 6SN7. Plate power is supplied to the tubes 126 through resistors 128 from the same regulated B+ source and the cathodes are grounded through a common resistor 130. The fourth stage of amplification includes tubes 132 each of which may be one-half of a 6SN7 supplied with plate power from the same regulated B+ source through resistors 134. The cathodes are grounded through a common resistor 136 and the third stage is coupled to the fourth by capacitors 138 and grid resistors 140. Inverse feedback is provided by resistors 142 between the plates of the tubes 132 and 126. The fifth stage of the amplifier is a power output stage comprising power output tubes 144 which in the present instance are triode connected multi-grid tubes which may be 6L6's. Plate power is supplied to these tubes through the center tapped primary of an output transformer 146 and a resistor 148 from an unregulated source of B+ in the power supply to be discussed subsequently. The cathodes of the tubes 144 are grounded through series connected resistors 150 and 152 with the grid resistors 154 of the control grids being connected to the junctions between the resistors 150 and 152. The fourth stages of amplification are connected to the power output stage by capacitors 156 and the previously noted grid-resistors 154. The secondary of the output transformer 146 is connected to the current coil of the watt-hour meter used to indicate total flow. It should be noted that a decoupling filter is used in only the first stage of the amplifier. This is permissible partly because of the feedback and partly because of the very low differential impedance of the power supply as will be apparent from the description of the power supply.

Figure 7:
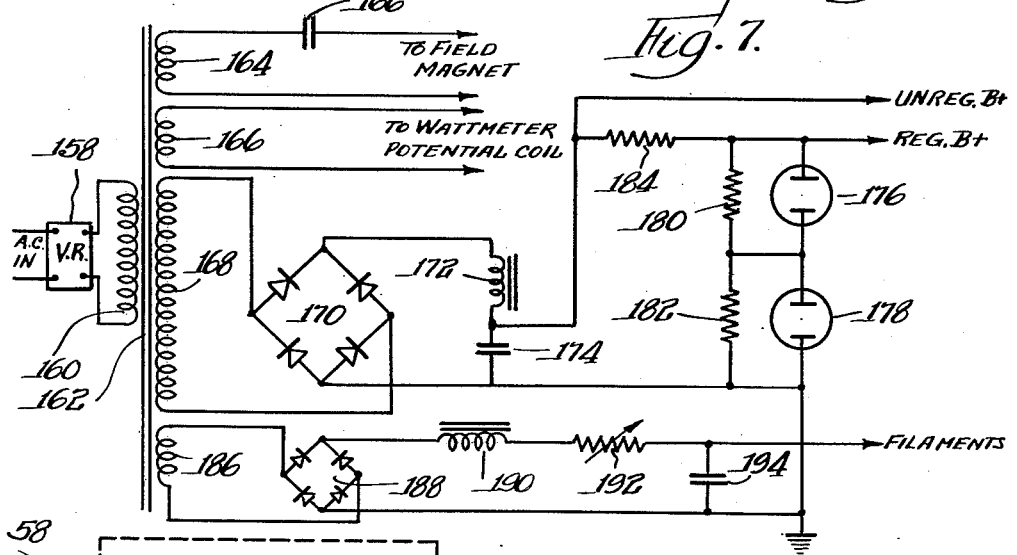
Fig. 7 is a schematic diagram of the regulated power supply.

The power supply (Fig. 7) is supplied by an AC line through a voltage regulator 158. The voltage regulator is of the type commercially available which delivers an output of 115 volts plus or minus 1% for an input of 95–130 volts. The voltage regulator is connected to the primary winding 160 of a transformer 162. One secondary 164 of the transformer 162 is connected to the coils 24 of the field magnet 18. A capacitor 166 is inserted in series with the secondary 164 and coils 124 in order to tune the circuit. By tuning the circuit, harmonics which may be set up by the voltage regulator 158 are eliminated and a low voltage transformer winding may supply a high voltage to the magnet coils. A secondary winding 166 energizes the watt-meter potential coil.

B+ plate voltage for the various tubes in the preamplifier and amplifier is derived from a third secondary 168 connected across a full wave bridge rectifier 170, the output of which is applied to a filter including a choke 172 and a capacitance 174, the latter having one side grounded. The unregulated B+ which is supplied to the power output stage of the amplifier is taken directly from the junction between the choke 172 and the capacitor 174. Regulated B+ is supplied from glow tubes 176 and 178 having resistors 180 and 182 respectively connecting in parallel therewith. Potential is supplied to the glow tubes through a resistor 184 from a junction between the choke 172 and capacitor 174. The differential impedance presented to the load by the glow tubes is very low, which as noted earlier, obviates the need for decoupling filters in the various stages of the amplifier.

A fourth secondary winding 186 of the power transformer 162 is connected across a full wave bridge type rectifier 188 which supplies direct current for the tube filaments through a filter including a choke 190, adjustable resistor 192 and capacitor 194, the adjustable resistor making it possible to vary the current supplied to the filaments. The direct current filament source is used to remove any possibility of hum which might be generated by AC operated filaments.

It is apparent that I have herein presented an improved electromagnetic apparatus for measuring fluid flow. A straight flow tube of uniform cross section is utilized which may be inserted readily in any flow pipe. This flow tube does not restrict the flow and is easy to clean when removed. Novel means are disclosed for shielding the apparatus and electronic means for balancing out noise and pickup voltages are disclosed. A readily available watt-hour meter is used as an integrating instrument to register the total amount of fluid flow and an improved voltage regulated power supply obviating the necessity of decoupling features in the amplifying stages is disclosed.

Although a particular embodiment of my invention has been shown and described, it is to be understood that this is for illustrative purposes only and that my invention contemplates all that which is included in the following claims.

I claim:

1. Apparatus for measuring fluid flow comprising a conduit for carrying a flowing fluid, electromagnetic means including a coil for establishing a magnetic field through a section of said conduit, a plurality of electrodes electrically communicating with a fluid flowing in said conduit to detect a potential induced in said fluid, amplifying means, means for transmitting the potential detected to said amplifying means, conductive means over said coil for shielding said electrodes and said transmitting means from magnetic and electric fields, and means connecting said conductive means to said amplifying means for injecting a voltage into said amplifying means which is a function of the magnetic and electric fields intercepted by said conductive means, to compensate for stray voltages induced by said fields.

2. Apparatus for measuring fluid flow as set forth in claim 1 wherein the conductive means over the coil comprises a compensating coil.

3. Apparatus for measuring fluid flow as set forth in claim 1 wherein the connecting means includes means for adjusting the phase and amplitude of the voltage injected into said amplifying means.

4. Apparatus for measuring fluid flow comprising a conduit for carrying a flowing fluid, electromagnetic means having a coil and a pole for establishing a magnetic field through a section of said conduit, a plurality of electrodes for detecting a potential induced in a fluid flowing through said conduit, amplifying means, means for transmitting the potential detected to said amplifying means, a section of conductive material over said coil and exposing said pole to shield said electrodes and transmitting means from stray flux from said coil, and means connecting said section of conductive material to said amplifying means for injecting a voltage into said amplifying means which is a function of the magnetic and electric fields intercepted by said section of conductive material.

5. Apparatus for measuring fluid flow comprising a conduit for carrying a flowing fluid, electromagnetic means having a coil and a pole for establishing a magnetic field through a section of said conduit, a plurality of electrodes for detecting a potential induced in a fluid flowing through said conduit, means for transmitting the potential detected to another station, a bifurcated section of conductive material over said coil and exposing said pole to shield said electrodes and transmitting means from stray flux from said coil, said bifurcated section forming a one turn coil, and means for utilizing a voltage induced in said coil to compensate for stray voltage induced in other parts of said apparatus.

6. Apparatus for measuring fluid flow comprising a conduit for carrying a flowing fluid, electromagnetic means having a coil and a pole for establishing a magnetic field through a section of said conduit, a plurality of electrodes for detecting a potential induced in a fluid flowing through said conduit, means for amplifying the potential detected, means for transmitting the potential detected to said amplifying means, a bifurcated section of conductive material over said coil and exposing said pole to shield said electrodes and transmitting means from stray flux from said coil, said bifurcated section forming a one turn coil, and means including phase and amplitude determining means interconnecting said bifurcated section and said amplifying means for injecting a voltage into said amplifying means to compensate for stray voltages induced in other parts of said apparatus.

7. Apparatus for measuring fluid flow comprising a conduit for carrying a flowing fluid, electromagnetic means having a coil and a pole for establishing a magnetic field through a section of said conduit, a plurality of electrodes for detecting a potential induced in a fluid flowing through said conduit, push-pull means for amplifying the potential detected, means for transmitting the potential detected to said push-pull amplifying means, a bifurcated section of conductive material over said coil and exposing said pole to shield said electrodes and transmitting means from stray fields from said coil, said bifurcated section forming a one turn coil, and means including phase and amplitude determining means for injecting a voltage induced in said bifurcated section into said push-pull amplifying means to compensate for stray voltages induced in other parts of said apparatus.

8. Apparatus for measuring fluid flow comprising a conduit for carrying a flowing fluid, electromagnetic means having a coil and a pole for establishing a magnetic field through a section of said conduit, a plurality of electrodes for detecting a potential induced in a fluid flowing through said conduit, means for transmitting the potential detected to another station, means forming a compensating coil substantially coaxial with said first named coil and lying between said first named coil and said conduit for shielding said conduit from stray fields from said coils, and means for utilizing a voltage induced in said compensating coil to compensate for stray voltages induced in other parts of said apparatus.

9. Apparatus as set forth in claim 8 wherein the compensating coil is a single turn coil.

10. Apparatus for measuring fluid flow comprising a conduit for carrying a flowing fluid, electromagnetic means having a coil and a pole for establishing a magnetic field through a section of said conduit, electrode means for detecting a potential induced in a fluid flowing through said conduit, amplifying means having grid and cathode circuits, means for connecting said electrode means to one of said circuits, a bifurcated section of conductive material over said coil and exposing said pole to shield said electrodes and transmitting means from stray flux from said coil, said bifurcated section forming a one turn coil, and means connecting said bifurcated section to the other of said circuits to inject a voltage induced in said bifurcating section into said amplifying means to compensate for stray voltages induced in other parts of said apparatus.

11. Apparatus as set forth in claim 10 wherein said amplifying means is cathode coupled to present a relatively low output impedance.

12. Apparatus for measuring fluid flow comprising a conduit for carrying a flowing fluid, electromagnetic means including a coil for establishing a magnetic field through a section of said conduit, pick-up means associated with said conduit for detecting a potential induced in said fluid, amplifying means, means for transmitting the potential detected to said amplifying means, conductive means over said coil for shielding said electrodes and said transmitting means from magnetic and electric fields, and means connecting said conductive means to said amplifying means for injecting a voltage into said amplifying means which is a function of the magnetic and electric fields intercepted by said conductive means to compensate for stray voltages induced by said fields.

References Cited in the file of this patent

UNITED STATES PATENTS

| Number | Name | Date |
|---|---|---|
| 1,548,022 | Casper et al. | Aug. 4, 1925 |
| 2,067,645 | Pinkerton | Jan. 12, 1937 |
| 2,229,373 | Cole | Jan. 21, 1941 |
| 2,277,285 | Woodling | Mar. 24, 1942 |
| 2,386,892 | Hadfield | Oct. 16, 1945 |
| 2,433,771 | Lindenberg et al. | Dec. 30, 1947 |
| 2,435,043 | Lehde | Jan. 27, 1948 |
| 2,518,797 | Landon | Aug. 15, 1950 |
| 2,583,561 | General et al. | Jan. 29, 1952 |

OTHER REFERENCES

The Review of Scientific Instruments, vol. 16, No. 5, pp. 109–116, May 1945, A. Kolin.

Mechanical Measurements by Electrical Methods, Roberts, Instrument Pub. Co. Inc., Pittsburgh, 1946, p. 302.